US008908620B2

(12) United States Patent
Kim et al.

(10) Patent No.: US 8,908,620 B2
(45) Date of Patent: Dec. 9, 2014

(54) METHOD AND APPARATUS FOR TRANSMITTING RESOURCE ALLOCATION INFORMATION

(75) Inventors: Jun-Woo Kim, Daejeon (KR); Jung Pil Choi, Daejeon (KR); Eon Young Hong, Daejeon (KR); Youn Ok Park, Daejeon (KR)

(73) Assignees: Samsung Electronics Co., Ltd., Suwon-Si (KR); Electronics and Telecommunications Research Institute, Daejeon (KR)

( * ) Notice: Subject to any disclaimer, the term of this patent is extended or adjusted under 35 U.S.C. 154(b) by 462 days.

(21) Appl. No.: 13/140,334

(22) PCT Filed: Jul. 17, 2009

(86) PCT No.: PCT/KR2009/003958
§ 371 (c)(1),
(2), (4) Date: Jun. 16, 2011

(87) PCT Pub. No.: WO2010/071287
PCT Pub. Date: Jun. 24, 2010

(65) Prior Publication Data
US 2012/0051298 A1 Mar. 1, 2012

(30) Foreign Application Priority Data
Dec. 18, 2008 (KR) .................... 10-2008-0129455

(51) Int. Cl.
*H04W 4/00* (2009.01)
*H04W 72/04* (2009.01)

(52) U.S. Cl.
CPC .................................. *H04W 72/042* (2013.01)
USPC ....................................................... 370/329

(58) Field of Classification Search
USPC .......................................................... 370/329
See application file for complete search history.

(56) References Cited

U.S. PATENT DOCUMENTS

| | | | |
|---|---|---|---|
| 2006/0256758 A1 | 11/2006 | Malkamaki et al. | |
| 2007/0140167 A1 | 6/2007 | Jang et al. | |
| 2007/0230412 A1 | 10/2007 | McBeath et al. | |
| 2008/0232319 A1* | 9/2008 | Son et al. | 370/329 |
| 2009/0059860 A1* | 3/2009 | Maltsev et al. | 370/330 |
| 2009/0075667 A1* | 3/2009 | Bourlas | 455/452.1 |
| 2010/0069081 A1* | 3/2010 | Mitra et al. | 455/452.2 |
| 2010/0080180 A1* | 4/2010 | Tortora | 370/329 |

FOREIGN PATENT DOCUMENTS

| | | |
|---|---|---|
| KR | 10-2008-0009731 | 1/2008 |
| KR | 10-2008-0086780 | 9/2008 |
| WO | WO 2008/054027 A2 | 5/2008 |

OTHER PUBLICATIONS

International Search Report and Written Opinion of International Searching Authority dated May 31, 2010 in connection with PCT Application No. PCT/KR2009/003958.
Sanjiv Nanda, et al.: "A Retransmission Scheme for Circuit-Mode Data on Wireless Links", IEEE Journal of Selected Areas in Communications, pp. 587-592, Oct. 1994.

* cited by examiner

*Primary Examiner* — Jason Mattis
*Assistant Examiner* — Adnan Baig (57) ABSTRACT

Provided are a method and an apparatus for transmitting resource allocation information. In the case when a wireless resource for a new terminal is fixedly allocated to a fixed allocation zone, the apparatus for transmitting resource allocation information determines a resource allocation method of allocating the wireless resource and determines an allocation form of a resource that is allocated by a resource allocation method to select any one information displaying method of a plurality of information displaying methods of displaying allocation information on the allocated resource on the basis of the determined resource allocation method and resource allocation form. Next, the resource allocation information is generated and transmitted on the basis of the selected displaying method.

20 Claims, 3 Drawing Sheets

FIXED ALLOCATION ZONE

Fig. 3

FIXED ALLOCATION ZONE

Fig. 4

FIXED ALLOCATION ZONE

Fig. 5

FIXED ALLOCATION ZONE

METHOD AND APPARATUS FOR TRANSMITTING RESOURCE ALLOCATION INFORMATION

CROSS-REFERENCE TO RELATED APPLICATION(S)

The present application claims priority under 35 U.S.C. §365 to International Patent Application No. PCT/KR2009/003958 filed Jul. 17, 2009, entitled "METHOD AND APPARATUS FOR TRANSMITTING RESOURCE ALLOCATION INFORMATION". International Patent Application No. PCT/KR2009/003958 claims priority under 35 U.S.C. §365 and/or 35 U.S.C. §119(a) to Korean Patent Application No. 10-2008-0129455 filed Dec. 18, 2008, and which are incorporated herein by reference into the present disclosure as if fully set forth herein.

TECHNICAL FIELD

The present invention relates a method and an apparatus for transmitting resource allocation information.

BACKGROUND ART

In the Institute of Electrical and Electronic Engineers (IEEE) 802.16e Mobile WiMAX packet communication scheme, there is an attempt to fixedly allocate wireless resources required for terminals by using a fixed allocation (or circuit mode) scheme.

In the fixed allocation scheme, allocation information of the wireless resources is not notified to the terminal every frame, but rather the allocation information is notified to the terminal through a downlink map (DL-map) only when the wireless resource is firstly allocated and the allocation information is changed. Therefore, the size of the downlink map can be reduced, and in the case of a service that must be fixedly allocated with a constant amount of data such as a voice over Internet protocol (VoIP) service or a VOD service for a long time, overhead can be prevented. In the case when the wireless resources are fixedly allocated to the terminals by using the fixed allocation scheme, the size of the downlink map depends on a method of notifying the allocation information for each allocated wireless resource.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method and an apparatus for transmitting resource allocation information having an advantage of transmitting allocation information for each allocated wireless resource in an optimum form when a wireless resource required for a terminal is fixedly allocated.

Solution to Problem

The present invention has also been made in an effort to provide a method and an apparatus for transmitting resource allocation information having an advantage of minimizing the size of a downlink map that transmits allocation information.

An exemplary embodiment of the present invention provides a method for transmitting resource allocation information, including: determining a resource allocation method of allocating a wireless resource in the case when the wireless resource for a new terminal is fixedly allocated to a fixed allocation zone; determining an allocation form of the resource allocated by the resource allocation method; selecting one information displaying method from among a plurality of information displaying methods to display resource allocation information on the allocated resource on the basis of the determined resource allocation method and the allocation form of the resource; generating the resource allocation information on the basis of the selected displaying method; and transmitting the resource allocation information.

Another embodiment of the present invention provides an apparatus for transmitting resource allocation information that includes: a scheduler that fixedly allocates a wireless resource for a new terminal to a fixed allocation zone, generates resource allocation information on the basis of an information displaying method selected according to a performed resource allocation method and a resource allocation form, and allocates the resource allocation information to a downlink map; a channel encoder that encodes the resource allocation information and data for the terminal, which is allocated to the fixed allocation zone; and a modulator that modulates and transmits the encoded resource allocation information and data for the terminal.

Yet another embodiment of the present invention provides a method for transmitting resource allocation information in the case when a wireless resource for a new terminal is fixedly allocated to a fixed allocation zone, that including: judging whether a remaining wireless resource where allocation is not performed is provided in the fixed allocation zone; judging whether or not rearrangement of wireless resources used by terminals using a fixed allocation method is necessary after extending the fixed allocation zone when the remaining wireless resource is not provided; performing resource allocation by a first allocation method of fixedly allocating the remaining resource to the new terminal without changing the existing allocated resource in the case when rearrangement of the wireless resources is not necessary; performing the resource allocation by a second allocation method of rearranging all resources of the fixed allocation zone and fixedly allocating the rearranged resources to each terminal in the case when rearrangement of the wireless resources is necessary; generating the resource allocation information by selecting one of a plurality of information displaying methods on the basis of the performed resource allocation method; and transmitting the generated resource allocation information.

Advantageous Effects of Invention

According to an embodiment of the present invention, in a mobile communication system of a packet communication scheme, it is possible to minimize the size of a downlink map by transmitting data in a fixed allocation scheme. In addition, in the case of minimizing the size of control information such as the downlink map, it is possible to increase the transmission rate of an entire mobile communication system.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the mobile station, the mobile terminal, the subscriber station, the portable subscriber station, the user equipment, the access terminal, etc.

In the specification, a base station (BS) may designate an access point (AP), a radio access station (RAS), a node B, an evolved node-B (eNB), a base transceiver station (BTS), a mobile multihop relay (MMR)-BS, etc., and may include the entire or partial functions of the access point, the radio access station, the node B, the eNB, the base transceiver station, the MMR-BS, etc.

Hereinafter, a method and an apparatus for transmitting resource allocation information according to an exemplary embodiment will be described in detail with reference to the accompanying drawings.

Figure 1:
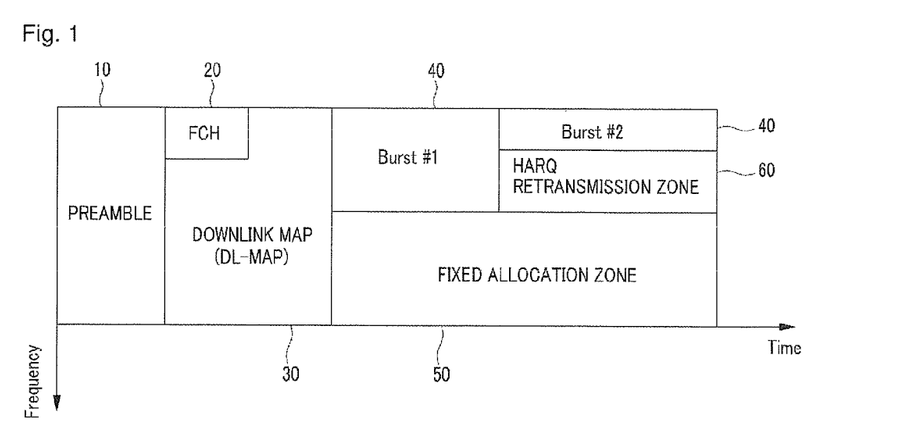
FIG. 1 is a diagram illustrating a structure of a frame in a mobile communication system according to an exemplary embodiment of the present invention.

FIG. 1 is a diagram illustrating a structure of a frame in a mobile communication system according to an exemplary embodiment of the present invention.

FIG. 1 illustrates a structure of a downlink frame, and illustrates a frame having a length of 5 ms.

As shown in FIG. 1, the downlink frame includes a preamble 10, a frame control header (hereinafter referred to as "FCH") 20, a downlink map (hereinafter, referred to as "DL-MAP") 30, a plurality of data bursts (burst #1 and burst #2) 40 to which actual data is transmitted, a fixed allocation zone 50, and a hybrid automatic repeat request (HARQ) retransmission zone 60.

The preamble 10 takes charge of frame synchronization and cell distraction. The FCH 20 is constituted by two sub-channels, and transfers basic information on the sub-channels, ranging, a modulation scheme, etc.

The DL-MAP 30 notifies information on positions, forms, modulation schemes, etc. of a plurality of data that are allocated to each terminal for each frame.

The fixed allocation zone 50 is a zone to which data that are fixedly allocated to predetermined terminals for each frame in accordance with a fixed allocation scheme are transmitted according to the embodiment of the present invention. The HARQ retransmission zone 60 is a zone to which retransmitted data are allocated when data is retransmitted to the predetermined terminals.

FIGS. 2 to 5 are diagrams illustrating an example of resource allocation by a fixed allocation scheme according to an exemplary embodiment of the present invention.

Figure 2:
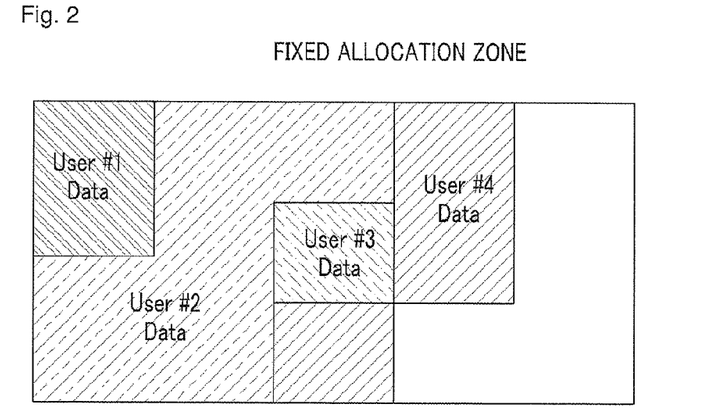
FIGS. 2 to 5 are diagrams illustrating an example of resource allocation by a fixed allocation scheme according to an exemplary embodiment of the present invention.

In the case when resources are allocated in accordance with the fixed allocation scheme, corresponding data zones User #1 Data to User #4 Data can be allocated to terminals User #1 to User #4 that are fixedly allocated with wireless resources in the fixed allocation zone 50 on a frequency axis in sequence, respectively, as shown in FIG. 2. Herein, the wireless resources are resources formed by the frequency axis and the time axis in the fixed allocation zone 50. Data loaded on each wireless resource is allocated to the corresponding terminal.

Figure 3:
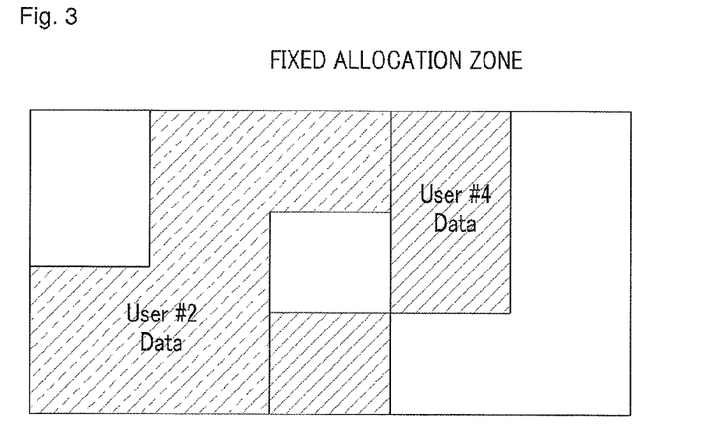

As such, in a state when the resources are fixedly allocated to the plurality of terminals User #1 to User #4, when the first terminal User #1 and the third terminal User #3 cancel being allocated with the wireless resources in the fixed allocation scheme, only the resources for the second terminal User #2 and the fourth terminal User #4 are allocated to the fixed allocation zone 50, as shown in FIG. 3.

Figure 4:
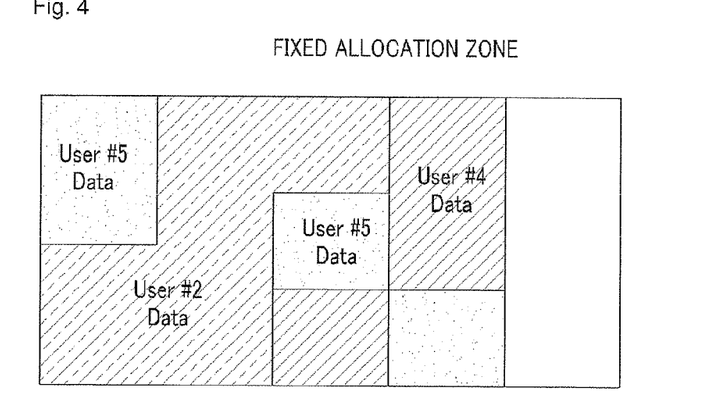
Figure 5:
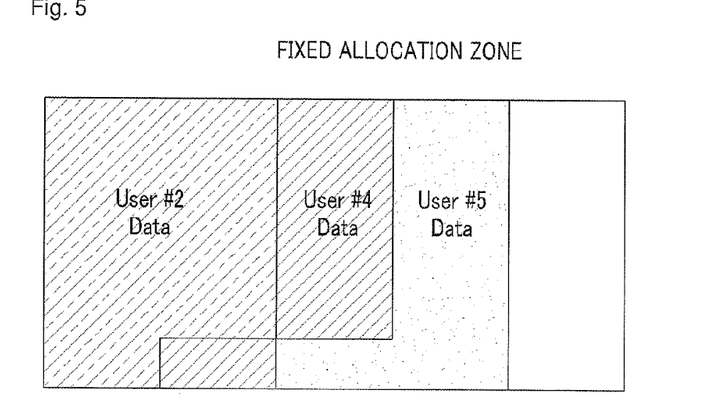

In this state, in the case when wireless resources are newly allocated to a fifth terminal User #5 on the basis of the fixed allocation scheme, a fixed resource for the fifth terminal User #5 is allocated to the fixed allocation zone 50. In this case, as shown in FIG. 4, the fixed resource for the fifth terminal User #5 may be divided into several pieces and allocated. Alternatively, the resources for the existing terminals and the resources for the new terminal are all rearranged, such that the resources may be allocated as shown in FIG. 5.

As described above, when changes for the fixed allocation zone 50 occur in the state when the resources are allocated, the fixed resource allocation is performed by either one of a first allocation scheme in which the remaining part of the fixed allocation zone 50 is allocated to a newly added terminal without changing the resources allocated to the existing terminals and a second allocation scheme in which all resources of the fixed allocation zone 50 including the resources for the existing terminals are rearranged and allocated to the terminals.

In the case when the changes for the fixed allocation zone 50 occur and the resources are thus allocated, information on changed resource allocation is transmitted by being included in the DL-MAP 30.

According to the embodiment of the present invention, a method of displaying the information on the changed resource allocation includes a method of displaying the resource allocation information by a bitmap method (alternatively referred to as "first information displaying method") and a method of transmitting the resource allocation information by a vector method (alternatively referred to as "second information displaying method").

The bitmap method displays whether or not a resource for a corresponding terminal is allocated to each of sub-channels constituting the entire fixed resource zone by "0" or "1". In the case when a downlink is constituted by 400 or more partial usages of sub-channels (PUSC) as sub-channels, all the PUSC sub-channels are displayed in a bitmap form, and even though the corresponding information is compressed, the information has a very large size. Therefore, the bitmap method is useful in the case when the size of the fixed allocation zone 50 is small and a wireless resource of a predetermined terminal is distributed into numerous small pieces.

The vector method provides information on a start point and an end point where the pieces constituting the wireless resource allocated to the predetermined terminal occupy in the fixed allocation zone 50. This method is useful in the case when the resource is constituted by a small number of pieces, but in the case when the resource is constituted by numerous pieces, the size of the corresponding information is increased, such that this method is not useful.

As such, since each information displaying method is useful or not useful depending on the allocated resource, in the embodiment of the present invention, information on the fixed resource allocation is transmitted by selecting either one of the first information displaying method which is the bitmap method and the second information displaying method which is the vector method depending on the resource allocation method performed with respect to the fixed allocation zone and the resource allocation form. Herein, the resource allocation form includes a first resource allocation form in which the wireless resource allocated to the predetermined is divided into plural pieces, which are positioned spaced apart from each other, and a second resource allocation form in which the wireless resource allocated to the predetermined is not divided into plural pieces or the wireless resource allocated to the predetermined terminal is divided into plural pieces, which are not positioned spaced apart from each other but are positioned back-to-back. In the case when the resource is allocated by the first resource allocation method, the allocated resource has either one of the first and second resource allocation forms, and in the case when the resource is allocated by the second resource allocation method, the allocated resource has the second resource allocation form. The resource allocation information in accordance with the first and second information displaying methods basically includes first information which is two-dimension information of the fixed allocation zone and second information which is allocation information for terminals that are allocated with the resources in the fixed allocation zone. The first information is equally included in the resource allocation information irrespective of the first and second information displaying methods, and the second information is changed depending on the information displaying method.

The first information, which is the two-dimension information of the fixed allocation zone 50 included in the resource allocation information, includes the following.

A. Start symbol of fixed allocation zone (start point on time axis)

B. Start sub-channel of fixed allocation zone (start point on frequency axis)

C. End symbol of fixed allocation zone (end point on time axis)

D. End sub-channel of fixed allocation zone (end point on frequency axis)

In addition, the second information, which is the information on the terminal of which the allocation information is changed in the fixed allocation zone, which is included in the resource allocation information, includes identification information of the terminal of which the allocation information is changed as follows, information indicating which method of the bitmap method and the vector method the allocation information is displayed by, and configuration information for each information displaying method.

A. Identification information of terminal of which allocation information is changed (e.g., ID)

B. Information indicating which method of bitmap method and vector method allocation information is displayed by (e.g., displayed by bit)

C. Configuration information when allocation information is displayed by first information displaying method which is bitmap method C-1 Compressed size of information displayed by bitmap C-2 Uncompressed size of information displayed by bitmap D. Configuration information when allocation information is displayed by second information displaying method which is vector method D-1. Value indicating the number of vectors constituting wireless resource of corresponding terminal D-2. Information on positions and lengths of vectors constituting wireless resource of corresponding terminal Herein, the information D-2 on the positions (start points) and lengths of the vectors constituting the wireless resource of the corresponding terminal can be configured as follows.

1. Start point of first vector (value acquired by counting sub-channels in fixed allocation zone in ascending order on the basis of frequency (referred to as "first frequency value"))

2. Length of first vector (number of sub-channels)

Start Point of N-th Vector

Length of N-th Vector

Next, a method of transmitting resource allocation information with respect to fixed resources according to an exemplary embodiment of the present invention will be described.

Figure 6:
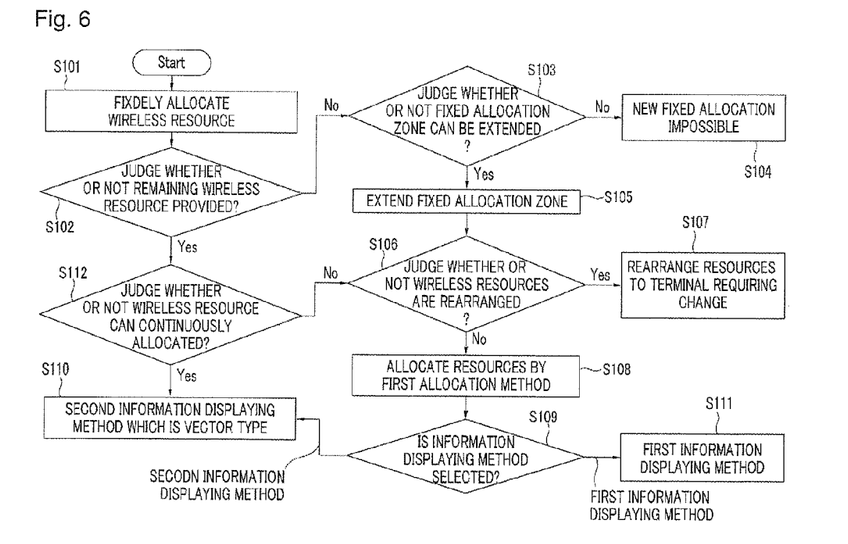
FIG. 6 is a flowchart of a method for transmitting fixed resource allocation information according to an exemplary embodiment of the present invention.

FIG. 6 is a flowchart of a method for transmitting fixed resource allocation information according to an exemplary embodiment of the present invention.

As shown in FIG. 6, in the case when a wireless resource for a new terminal is fixedly allocated to a fixed allocation zone 50 (S101), it is judged whether remaining wireless resources in the current fixed allocation zone 50 are sufficient to be allocated as the wireless resource for the new terminal (S102). Herein, the remaining wireless resources are the remaining wireless resources other than wireless resources that have already been allocated to the fixed allocation zone 50 by a fixed allocation method.

For example, as shown in FIG. 4, in the case when a fifth terminal User #5 is newly allocated with wireless resources by the fixed allocation method, the remaining wireless resources include wireless resources that are allocated to a first terminal User #1 and a third terminal User #3 that were fixedly allocated with the wireless resources and have cancelled the fixed resource allocation.

In the case when the remaining wireless resources are insufficient, it is judged whether the fixed allocation zone can be extended (S103). From the judgment result, unless the fixed allocation zone can be extended, the wireless resources cannot be allocated to the new terminal (S104).

On the contrary, in the case when the fixed allocation zone is extended on the basis of the judgment result (S105), it is checked whether rearranging the wireless resources used by the terminals using the existing fixed allocation method and wireless resources in the fixed allocation zone is effective (S106). In the case when the fixed allocation zone 50 according to the embodiment of the present invention is increased only in a time-axis direction, it is judged that rearranging the wireless resources is unnecessary, and in the case when the fixed allocation zone 50 is increased in a frequency-axis direction, it is judged that rearranging the wireless resources is effective. However, the present invention is not limited to the judgment method.

When it is judged that rearranging the wireless resources is effective, a fixed resource zone, that is, wireless resources of all terminals, which need to be changed, are rearranged in an optimum form (S107). As such, after the wireless resources are rearranged by a second allocation method, changed fixed resource allocation information is notified to all terminals that are influenced by changing the resource allocation. For example, as shown in FIG. 5, in the case when all the wireless resources in the fixed resource zone are rearranged, a base station must notify new changed allocation information of the wireless resources to all the terminals User #2, User #4, and User #5 that are allocated with the wireless resources by the fixed allocation method through a DL-MAP 30. Since the form of newly rearranged wireless resources is simply packed, the fixed resource allocation information is generated by the second information displaying method which is the vector method and the fixed resource allocation information generated in accordance with the vector method is transmitted by being included in the DL-MAP 30. This method is useful in the case when the number of terminals is small and allocation of the wireless resources is not frequently varied.

If rearranging the wireless resources is not effective, the resources are allocated by the first allocation method in which the remaining resources are fixedly allocated to a new terminal without changing the existing allocated resources (S108). Next, it is judged which method of the first and second information displaying methods effectively displays allocation information on resources that are changed after the resources are allocated by the first allocation method (S109).

For example, in the case when the wireless resources are allocated to the new terminal by using pieces of a predetermined number or less among the remaining resources or in the case when the wireless resources allocated to the new terminal are not positioned to be spaced apart from each other but are positioned back-to-back, the resource allocation information is generated by the second information displaying method which is the vector method and is included in the DL-MAP 30 (S110). On the contrary, in the case when the wireless resource are allocated to the new terminal by using pieces of more than a predetermined number or in the case when the wireless resources allocated to the new terminal are positioned to be spaced apart from each other, the resource allocation information is generated by the first information displaying method which is the bitmap method and is included in the DL-MAP 30 (S111). In addition, the resource allocation information is notified to only a terminal that is newly allocated with the resources.

For example, as shown in FIG. 4, in the case when the wireless resource on which data of the fifth terminal User #5 which is the new terminal are allocated by being divided into several pieces, the resource allocation information is generated by the second information displaying method which is the vector method. Herein, the changes are not notified to the first terminal User #1 and the third terminal User #3, and allocation of new wireless resources is notified only to the fifth terminal User #5 through the DL-MAP 30. On the contrary, when the wireless resource allocated to the fifth terminal User #5 is constituted by more pieces than those shown in FIG. 4, the resource allocation information is generated by the first information displaying method which is the bitmap method and notified to the fifth terminal User #5.

Meanwhile, in step S102, in the case when the remaining wireless resources are sufficient in the fixed allocation zone 50, it is judged whether or not the wireless resources can be continuously allocated to the new terminal through the fixed allocation method (S112). That is, it is judged whether or not the wireless resources that can be allocated to the new terminal can be allocated by being positioned back-to-back without being divided into several pieces.

From the judgment result, when the wireless resources can be continuously allocated, a wireless resource constituted by back-to-back pieces is fixedly allocated to the new terminal by the first allocation method without rearranging the wireless resources, and the resource allocation information on the allocated resource is generated by the second information displaying method which is the vector method and notified to the new corresponding terminal (S110). On the contrary, when the wireless resources cannot be continuously allocated, that is, in the case when the wireless resources that can be allocated to the new terminal are allocated by being divided into several pieces and positioned at different locations, rearrangement of the wireless resource allocation is selectively performed, as described above, in accordance with the judgment result by proceeding to the step (S106) of judging whether or not rearranging the wireless resources used by the terminals using the existing fixed allocation method is effective.

Next, a transmitting device 100 using a fixed allocation method according to the embodiment of the present invention that transmits resource allocation information according to an exemplary embodiment of the present invention will be described in detail with reference to FIG. 7.

Figure 7:
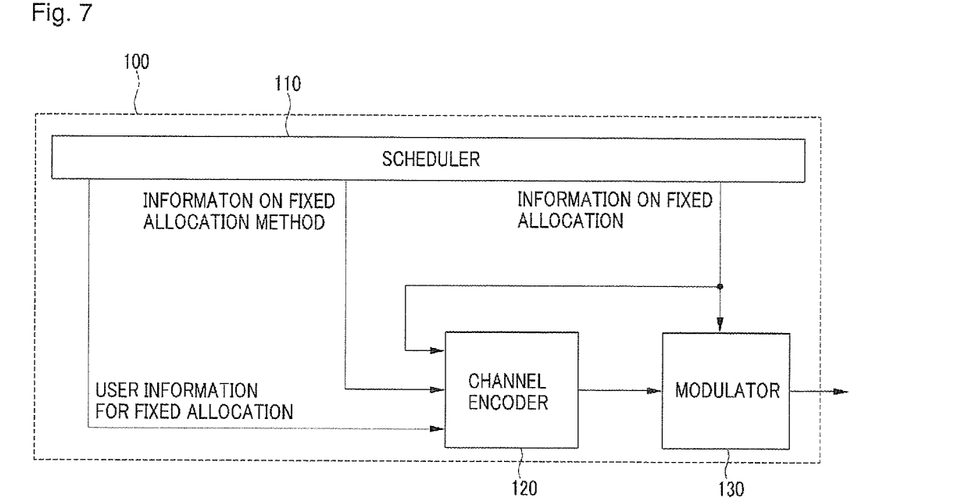
FIG. 7 is a schematic block diagram illustrating a transmitting device that transmits resource allocation information according to an exemplary embodiment of the present invention.

FIG. 7 is a schematic block diagram illustrating a transmitting device that transmits resource allocation information according to an exemplary embodiment of the present invention.

As shown in FIG. 7, the transmitting device 100 includes a scheduler 110 that performs resource allocation, a channel encoder 120, and a modulator 130.

The scheduler 110 performs the resource allocation and transfers the resource allocation information to the channel encoder 120 and the modulator 130. More specifically, the scheduler 110 performs fixed resource allocation, determines a method for displaying resource allocation information by the performed resource allocation method, and generates and allocates the resource allocation information corresponding thereto to the DL-MAP 30.

The resource allocation information includes the first information which is the two-dimension information of the fixed allocation zone and the second information which is the information on the terminal of which the allocation information is changed in the fixed allocation zone, as described above. As described above, the second information includes the information indicating whether the fixed resource allocation method is the first allocation method or the second allocation method, the information indicating whether the information displaying method set by the fixed resource allocation method is the first information displaying method which is the bitmap method or the second information displaying method which is the vector method, and information such as the size of information by the bitmap in the case of the bitmap method, and the number of used vectors and a start point and a length of each vector in the case of the vector method.

The channel encoder 120 encodes the resource allocation information including the first information and the second information that are allocated to the DL-MAP 30, which are transferred from the scheduler 110, and outputs the encoded resource allocation information as DL-MAP information. In addition, the channel encoder 120 encodes and outputs data on terminals allocated to the fixed allocation zone 50, which is transferred from the scheduler 110.

The modulator 130 transmits the DL-MAP information transferred from the channel encoder 120 as it is, and arranges the encoded data of the terminals, which are transferred from the channel encoder 120 in the fixed allocation zone 50, and transmits the encoded data.

Next, a receiving device 200 according to an exemplary embodiment of the present invention will be described in detail with reference to FIG. 8.

Figure 8:
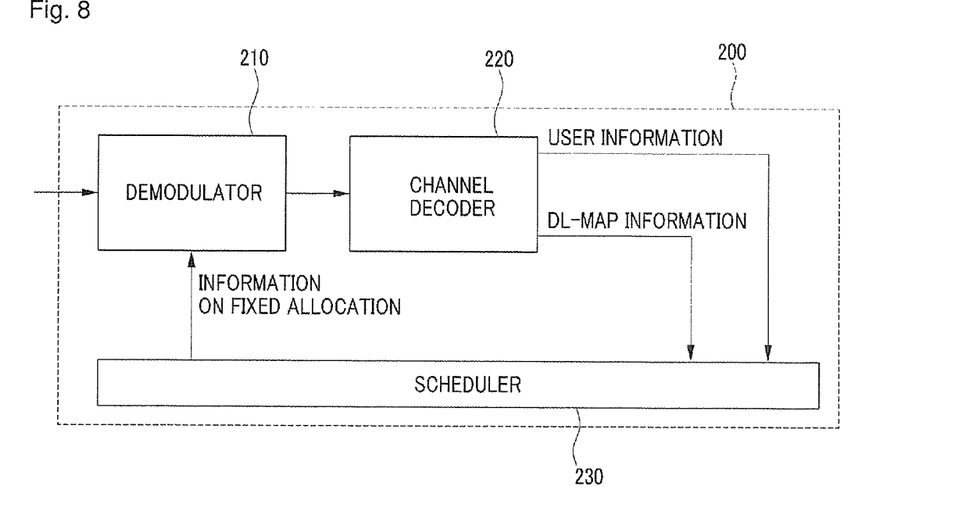
FIG. 8 is a schematic block diagram illustrating a transmitting device using fixed allocation according to an exemplary embodiment of the present invention.

FIG. 8 is a schematic block diagram illustrating a receiving device using fixed allocation according to an exemplary embodiment of the present invention.

As shown in FIG. 8, the receiving device 200 includes a demodulator 210, a channel decoder 220, and a scheduler 230.

The demodulator 210 demodulates and transfers the DL-MAP information included in a DM-MAP of a received frame to a channel decoder 220.

The channel decoder 220 generates the resource allocation information for the fixed allocation zone 50 by decoding the demodulated DL-MAP information.

The scheduler 230 verifies how the data of the corresponding terminal is allocated to the fixed allocation zone 50 of the frame received from the resource allocation information generated by the channel decoder 220, and notifies the verification result to the demodulator 210.

Therefore, the demodulator 210 finds data granted to the corresponding terminal from the fixed resource zone 50 of the received frame on the basis of the verification result, and transfers the data to the channel decoder 220. Accordingly, the channel decoder 220 can obtain the data granted to the corresponding terminal by decoding and outputting the data applied to the channel decoder 220.

The embodiments of the present invention are implemented not only through the apparatus and method, but may be implemented through a program that realizes functions corresponding to constituent members of the exemplary embodiments of the present invention or a recording medium in which the program is recorded. The implementation will be easily performed by those skilled in the art as described in the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for transmitting resource allocation information, the method comprising:
   determining a resource allocation method of allocating a wireless resource when the wireless resource for a new terminal is fixedly allocated to a fixed allocation zone by choosing between at least two methods comprising:
      a first allocation method for allocating a remaining zone that has not been allocated in the fixed allocation zone to the new terminal; and
      a second allocation method for rearranging all wireless resources in the fixed allocation zone and allocating the rearranged wireless resources to terminals including the new terminal,
      wherein when resultant wireless resources according to the first allocation method are expanded in a frequency-axis direction, the second allocation method is chosen;
   determining an allocation form of the wireless resource allocated by the resource allocation method;
   selecting one information indication method from among a plurality of information indication methods to indicate resource allocation information on the allocated resource based on the determined resource allocation method and the allocation form of the resource;
   generating the resource allocation information based on the selected information indication method; and
   transmitting the resource allocation information.

2. The method of claim 1, wherein the plurality of information indication methods includes:
   a first information indication method which is a bitmap method that represents whether or not the resource for a terminal is allocated to each of a plurality sub-channels constituting the entire fixed resource zone by "0" and "1"; and
   a second information indication method which is a vector method that provides information on a start point and an end point where pieces constituting a wireless resource allocated to a terminal are positioned in the fixed allocation zone.

3. The method of claim 2, wherein the allocation form includes at least one of:
   a first resource allocation form in which a wireless resource allocated to a predetermined terminal is divided into a plurality of pieces, which are positioned to be spaced apart from each other; and
   a second resource allocation form in which the wireless resource allocated to the predetermined terminal is one of not divided into the plurality of pieces and divided into the plurality of pieces, which are not positioned to be spaced apart from each other in a back-to-back orientation.

4. The method of claim 3, wherein selecting the one information indication method includes:
   selecting the first information indication method when the resource allocation method is the first allocation method and the allocation form is the first resource allocation form;
   selecting the second information indication method when the resource allocation method is the first allocation method and the allocation form is the second resource allocation form; and
   selecting the second information indication method when the resource allocation method is the second allocation method.

5. The method of claim 1, wherein transmitting the resource allocation information includes:
   transmitting the resource allocation information to the new terminal when the resource allocation method is the first allocation method; and
   transmitting the resource allocation information to all terminals that are provided with the resource allocated to the fixed resource zone when the resource allocation method is the second allocation method.

6. The method of claim 2, wherein the resource allocation information includes first information which is two-dimension information of the fixed allocation zone and second information which is allocation information for terminals that are allocated with the resources in the fixed allocation zone, wherein the second information includes identification information of a terminal of which allocation information is changed, a used information indication method, and configuration information for each information indication method.

7. The method of claim 6, wherein the configuration information of the second information includes:
   a compressed size of information displayed by a bitmap and an uncompressed size of the information displayed by the bitmap when the information indication method is the first information indication method; and
   a value indicating the number of vectors constituting a wireless resource of a predetermined terminal and information such as positions and lengths of the vector constituting the wireless resource of the terminal when the information indication method is the second information indication method.

8. An apparatus for transmitting resource allocation information, the apparatus comprising:
a scheduler configured to:
determine a resource allocation method of allocating a wireless resource when the wireless resource for a new terminal is fixedly allocated to a fixed allocation zone by choosing between at least two methods comprising:
a first allocation method for allocating a remaining zone that has not been allocated in the fixed allocation zone to the new terminal; and
a second allocation method for rearranging all wireless resources in the fixed allocation zone and allocating the rearranged wireless resources to terminals including the new terminal,
wherein when resultant wireless resources according to the first allocation method are expanded in a frequency-axis direction, the second allocation method is chosen;
fixedly allocate a wireless resource for a new terminal to a fixed allocation zone according to the determined allocation method;
select a first indication method to indicate a resource allocation state of the fixed allocation zone by a bit when the first allocation method is chosen and the allocated resources are positioned to be spaced apart from each other, and select a second indication method indicating a start point and an end point of each resource when the first allocation method is chosen and the allocated resources are positioned back-to-back, generate resource allocation information based on an information indication method selected according to a performed resource allocation method and a resource allocation form, and allocate the resource allocation information to a downlink map;
a channel encoder configured to encode the resource allocation information and data for the terminal, which is allocated to the fixed allocation zone; and
a modulator configured to modulate and transmit the encoded resource allocation information and data for the terminal.

9. The apparatus of claim 8, wherein the second indication method, which is a vector method indicating the start point and the end point of each resource, is selected when the resource allocation method is the second allocation method of rearranging all wireless resources of the fixed allocation zone and allocating all the wireless resources to terminals including the new terminal.

10. A method for transmitting resource allocation information when a wireless resource for a new terminal is fixedly allocated to a fixed allocation zone, the method comprising:
judging whether a remaining wireless resource where allocation is not performed is provided in the fixed allocation zone;
judging whether to rearrange wireless resources used by terminals using a fixed allocation method after extending the fixed allocation zone when the remaining wireless resource is not provided;
performing a resource allocation by either a first allocation method of fixedly allocating the remaining resource to the new terminal without changing an existing allocated resource without rearranging the wireless resources or a second allocation method of rearranging all resources of the fixed allocation zone and fixedly allocating the rearranged resources to each terminal when the wireless resources are to be rearranged,
wherein when resultant wireless resources according to the first allocation method are expanded in a frequency-axis direction, the second allocation method is chosen;
generating the resource allocation information by selecting one of a plurality of information indication methods based on the performed resource allocation method; and
transmitting the generated resource allocation information.

11. The method of claim 10, further comprising:
judging whether it is possible to continuously allocate wireless resources to be positioned adjacent to the new terminal when the remaining wireless resource is provided; and
fixedly allocating a wireless resource constituted by pieces that are continuously arranged in the new terminal by the first allocation method when it is possible to continuously allocate.

12. The method of claim 10, wherein generating the resource allocation information includes:
generating the corresponding resource allocation information by a first information indication method which is a bitmap method when rearrangement of the wireless resources is not necessary and resource allocation is performed by the first allocation method;
generating the corresponding resource allocation information by a second information indication method which is a vector method when rearrangement of the wireless resources is necessary and the resource allocation is performed by the second allocation method; and
generating the corresponding resource allocation information by the second information indication method which is the vector method when the wireless resource constituted by the pieces that are continuously arranged in the new terminal is fixedly allocated by the first allocation method because the remaining resource is provided.

13. The method of claim 12, wherein the first information indication method indicates whether the resource for the corresponding terminal is allocated to sub-channels constituting the entire fixed resource zone by "0" and "1", and the second information indication method provides information on a start point and an end point where each of the pieces constituting the wireless resource allocated to a predetermined terminal occupies the fixed allocation zone.

14. The method of claim 10, wherein the resource allocation information includes first information which is two-dimension information of the fixed allocation zone and second information which is allocation information for terminals that are allocated with the resources in the fixed allocation zone, wherein the second information includes identification information of a terminal of which allocation information is changed, a used information indication method, and configuration information for each information indication method.

15. The method of claim 14, wherein the second information further includes information indicating whether the fixed resource allocation method is one of at least the first allocation method and the second allocation method.

16. The method of claim 10, further comprising judging whether the fixed allocation zone can be extended when the remaining wireless resource is not provided.

17. The method of claim 16, further comprising determining that the wireless resources cannot be allocated to the new terminal when the fixed allocation zone cannot be extended and the remaining wireless resource is not provided.

18. The method of claim 10, further comprising determining an allocation form of the wireless resource allocated by the resource allocation method, wherein the allocation form comprises one of at least a first resource allocation form in which a wireless resource allocated to a predetermined terminal is divided into a plurality of pieces, which are positioned to be spaced apart from each other, and a second resource allocation form in which the wireless resource allocated to the predetermined terminal is one of not divided into the plurality of pieces and divided into the plurality of pieces, which are not positioned to be spaced apart from each other in a back-to-back orientation.

19. The apparatus of claim 8, wherein the resource allocation form includes at least one of:
- a first resource allocation form in which a wireless resource allocated to a predetermined terminal is divided into a plurality of pieces, which are positioned to be spaced apart from each other; and
- a second resource allocation form in which the wireless resource allocated to the predetermined terminal is one of not divided into the plurality of pieces and divided into the plurality of pieces, which are not positioned to be spaced apart from each other in a back-to-back orientation.

20. The apparatus of claim 19, wherein the scheduler is further configured to:
- select the first information indication method when the resource allocation method is the first resource allocation method and the resource allocation form is the first resource allocation form;
- select the second information indication method when the resource allocation method is the first resource allocation method and the resource allocation form is the second resource allocation form; and
- select the second information indication method when the resource allocation method is the second resource allocation method.

\* \* \* \* \*